United States Patent
Fujikawa et al.

(10) Patent No.: US 9,607,234 B2
(45) Date of Patent: Mar. 28, 2017

(54) METHOD AND APPARATUS FOR PROCESSING IMAGES, AND STORAGE MEDIUM STORING THE PROGRAM

(71) Applicant: OMRON Corporation, Kyoto-shi, Kyoto (JP)

(72) Inventors: Masahiro Fujikawa, Nara (JP); Yasuyuki Ikeda, Kyoto (JP); Yuki Akatsuka, Okayama (JP)

(73) Assignee: OMRON CORPORATION, Kyoto (JP)

( * ) Notice: Subject to any disclaimer, the term of this patent is extended or adjusted under 35 U.S.C. 154(b) by 143 days.

(21) Appl. No.: 14/642,772

(22) Filed: Mar. 10, 2015

(65) Prior Publication Data

US 2015/0262022 A1    Sep. 17, 2015

(30) Foreign Application Priority Data

Mar. 14, 2014   (JP) .................. 2014-051643

(51) Int. Cl.
| | |
|---|---|
| G06K 9/00 | (2006.01) |
| G06K 9/18 | (2006.01) |
| G06K 9/03 | (2006.01) |
| G06K 9/46 | (2006.01) |
| G06K 9/52 | (2006.01) |
| G06K 9/62 | (2006.01) |

(Continued)

(52) U.S. Cl.
CPC .............. *G06K 9/18* (2013.01); *G06K 9/03* (2013.01); *G06K 9/2063* (2013.01); *G06K 9/46* (2013.01); *G06K 9/4652* (2013.01); *G06K 9/4661* (2013.01); *G06K 9/52* (2013.01); *G06K 9/6201* (2013.01); *G06T 7/0004* (2013.01); *G06K 2009/4666* (2013.01); *G06K 2209/01* (2013.01); *G06K 2209/19* (2013.01); *G06T 2207/30141* (2013.01)

(58) Field of Classification Search
CPC ... H04N 21/44008; G01S 17/42; G01S 17/89; G06K 9/01; G06K 2209/01; G06K 2209/19; G06K 9/03; G06T 2207/30141
USPC ............... 382/141, 143, 144, 213, 283, 103; 358/517, 538
See application file for complete search history.

(56) References Cited

U.S. PATENT DOCUMENTS

| | | | |
|---|---|---|---|
| 5,880,451 A | 3/1999 | Smith et al. | |
| 6,556,946 B2 * | 4/2003 | Sewell | H03M 1/28 |
| | | | 250/231.1 |

(Continued)

FOREIGN PATENT DOCUMENTS

| | | |
|---|---|---|
| EP | 0978087 A1 | 2/2000 |
| EP | 2568412 A1 | 3/2013 |

(Continued)

OTHER PUBLICATIONS

European Search Report from the corresponding European Patent Application No. 15158511.4 issued on Jul. 31, 2015.

*Primary Examiner* — Yosef Kassa
(74) *Attorney, Agent, or Firm* — Shinjyu Global IP

(57) ABSTRACT

An image processing method improves the extraction accuracy of objects other than symbols. The image processing method may include four processes. In the first process, an image is input. In the second process, a symbol in the image is read. In the third process, a mask area including the symbol is set. In the fourth process, an object located in an area other than the mark area in the image is recognized.

21 Claims, 11 Drawing Sheets

(51) Int. Cl.
*G06T 7/00* (2017.01)
*G06K 9/20* (2006.01)

(56) References Cited

U.S. PATENT DOCUMENTS

| | | | | |
|---|---|---|---|---|
| 6,674,919 B1* | 1/2004 | Ma | .......................... | G06K 7/14 |
| | | | | 382/199 |
| 7,055,118 B1* | 5/2006 | Kamepalli | ............ | G06F 17/504 |
| | | | | 716/107 |
| 7,148,479 B2* | 12/2006 | Onishi | ................. | G01N 23/225 |
| | | | | 250/310 |
| 7,290,717 B2* | 11/2007 | Schuessler | ........... | G06K 7/0004 |
| | | | | 235/487 |
| 7,414,943 B2* | 8/2008 | MacDonald | ........... | G11B 7/005 |
| | | | | 369/124.07 |
| 7,535,595 B2* | 5/2009 | Miyagi | .............. | H04N 1/40062 |
| | | | | 358/1.1 |
| 8,152,070 B2* | 4/2012 | Al-Hussein | ........ | G06K 7/10722 |
| | | | | 235/462.09 |
| 8,456,308 B2* | 6/2013 | Nelson | ................... | G08B 21/18 |
| | | | | 340/5.3 |
| 8,605,129 B1* | 12/2013 | Barson | ................... | B42D 25/29 |
| | | | | 347/224 |
| 2003/0168513 A1 | 9/2003 | Fitzgibbons et al. | | |
| 2013/0063620 A1 | 3/2013 | Kim et al. | | |

FOREIGN PATENT DOCUMENTS

| | | |
|---|---|---|
| JP | 2008-084174 A | 4/2008 |
| JP | 2008-139262 A | 6/2008 |
| JP | 2013-182567 A | 9/2013 |
| WO | 98/48373 A1 | 10/1998 |

\* cited by examiner

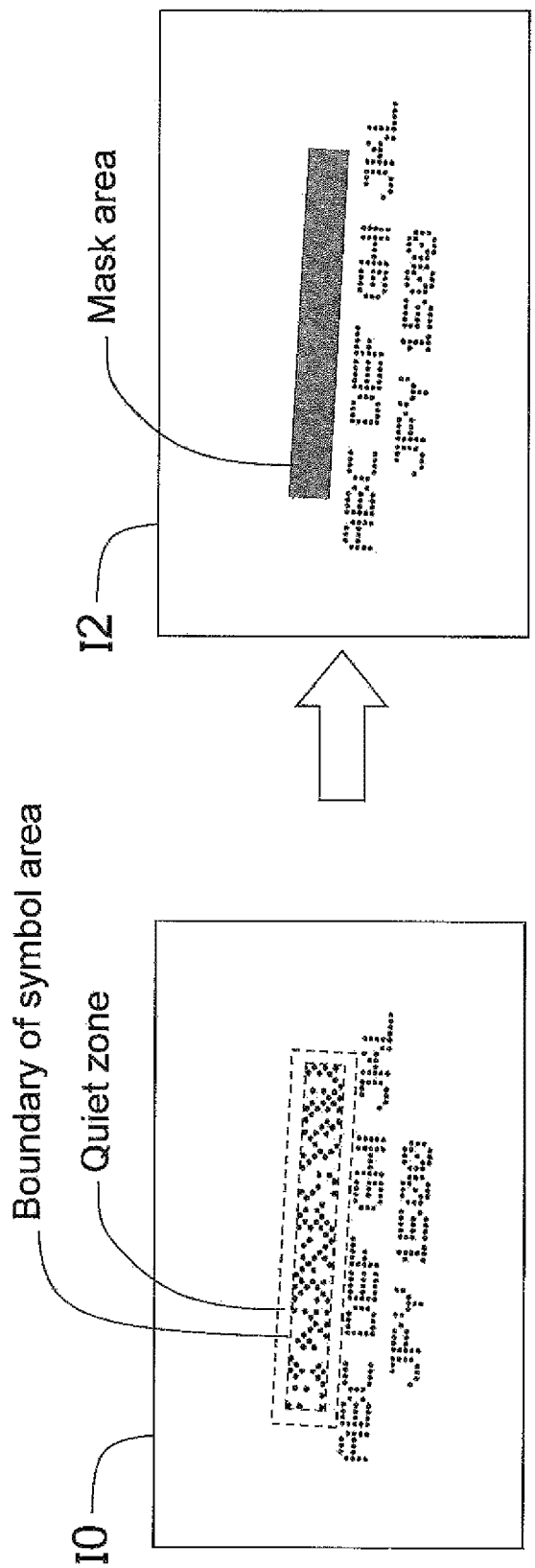

METHOD AND APPARATUS FOR PROCESSING IMAGES, AND STORAGE MEDIUM STORING THE PROGRAM

CROSS-REFERENCES TO RELATED APPLICATIONS

This application claims priority to Japanese Patent Application No. 2014-051643, filed Mar. 14, 2014, the contents of which are incorporated herein by reference in their entirety.

FIELD

The present invention relates to an image processing method, an image processing apparatus, and a storage medium storing the program.

BACKGROUND

Patent Literature 1 (Japanese Unexamined Patent Application Publication No. 2008-084174) describes one method for inspecting printed matter including multiple patterns of, for example, characters and images. With this method, a predetermined area of an image is set as a common data area and another predetermined area of the image is set as a character data area. A reference common data pattern for the common data area and a reference character data pattern for the character data area are generated from a reference image and are stored. For an inspection target image, the method extracts a partial image forming a common data area and a partial image forming a character data area. The partial image for the common data area is compared with the corresponding reference common data pattern, and the partial image for the character data area is compared with the corresponding reference character data pattern to finally determine the correctness of the printed matter. Such matching in divided areas of an image improves the efficiency of inspection.

However, an inspection target may include a plurality of different objects that are printed or inscribed close to one another. For example, a symbol such as a barcode may include numbers or characters printed close to one another for the convenience of users. Misalignment during transportation of such an inspection target on a conveyor line can cause a specified area of an image to erroneously contain a plurality of objects. This may result in the erroneous extraction of objects.

SUMMARY

In response to this problem, it is an object of the present invention to provide an image processing method and an image processing apparatus that improves the extraction accuracy of objects, and a storage medium storing the program.

An image processing method according to a first aspect of the present invention comprises receiving an image, reading a symbol in the image, setting a mask area containing the symbol, recognizing an object located in an area other than the mask area of the image.

An image processing apparatus according to a second aspect of the present invention comprises an image input component, a symbol reader, a mask area setting component, and an object recognition component. The image input component is configured to receive an image. The symbol reader is configured to read a symbol in the image. The mask area setting component is configured to set a mask area containing the symbol. The object recognition component is configured to recognize an object located in an area other than the mask area of the image.

A computer readable recording medium according to a third aspect of the present invention stores a program enabling a computer connected to an image input apparatus to implement a predetermined procedure. The predetermined procedure comprises receiving an image from the image input apparatus, reading a symbol in the image, setting a mask area containing the symbol, and recognizing an object located in an area other than the mask area of the image.

BRIEF DESCRIPTION OF THE DRAWINGS

FIGS. 6A and 6B are diagrams describing an example of the processing performed by the mask area setting component.

DETAILED DESCRIPTION

First Embodiment

Figure 1:
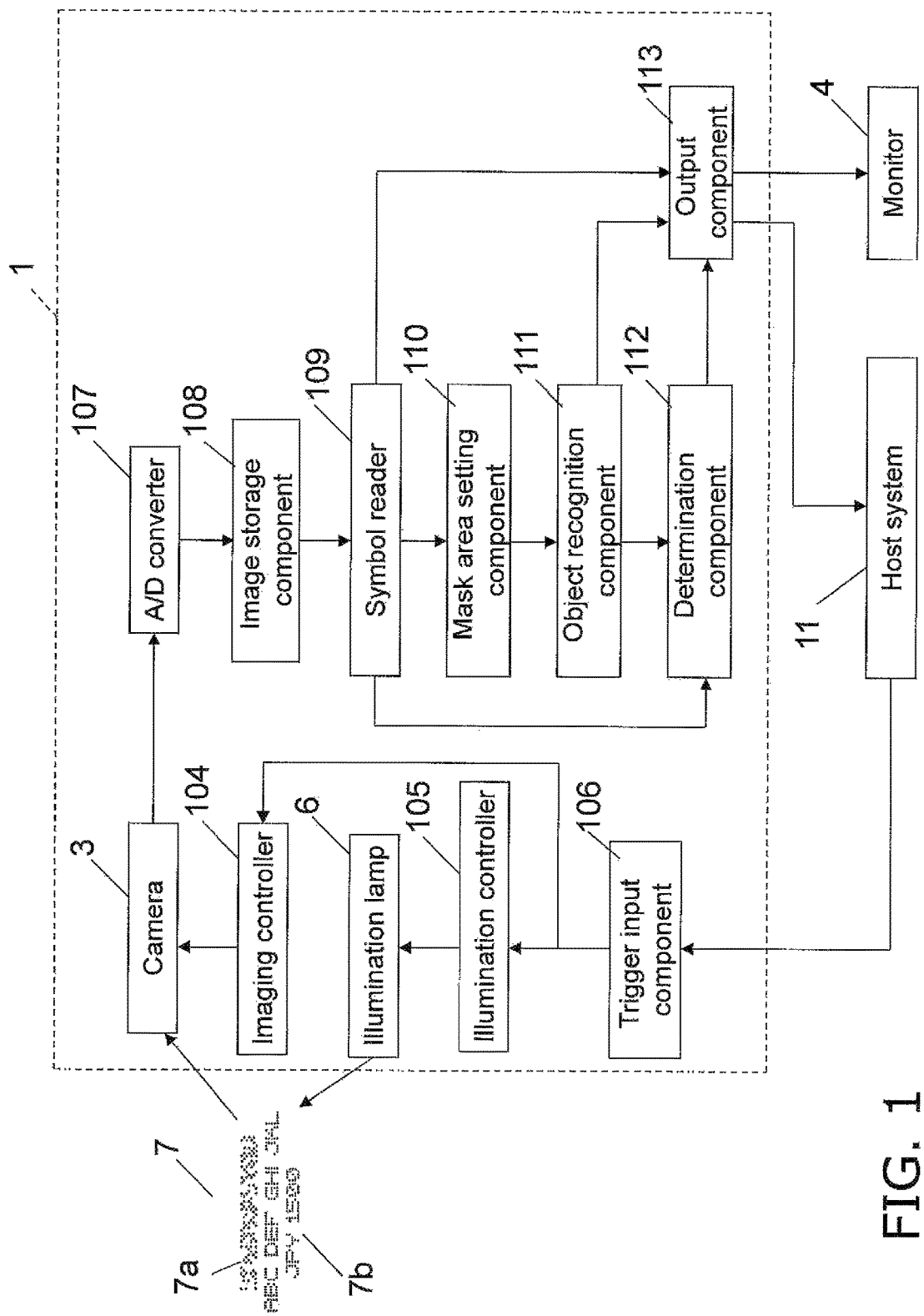
FIG. 1 is a block diagram showing the structure of an image processing apparatus according to a first embodiment.

One embodiment of the present invention will now be described in detail with reference to the drawings. In the figures, the same reference numerals refer to the same or the corresponding components.

FIG. 1 shows the structure of an image processing apparatus 1 according to the embodiment of the invention. In the figure, a camera 3 captures an image of a symbol 7a and an object 7b (the symbol 7a and the object 7b in combination are hereafter referred to as a combination object 7). An illumination lamp 6 illuminates the combination object 7, which is a processing target.

The image processing apparatus 1 includes an imaging controller 104, an illumination controller 105, a trigger input component 106, an A/D converter 107, an image storage component 108, a symbol reader 109, a mask area setting component 110, an object recognition component 111, a determination component 112, and an output component 113. A host system 11 controls the operation of the image processing apparatus 1. The host system 11 is, for example, a personal computer or a programmable logic controller (PLC). A monitor 4 may be included in the image processing apparatus 1.

The trigger input component 106 receives a trigger signal for triggering an image capturing operation from the host system 11. The trigger signal is transmitted to the imaging controller 104 and to the illumination controller 105. This activates the camera 3 under illumination by the illumination lamp 6 to capture an image of the combination object 7.

An image signal transmitted from the camera 3 is converted into a digital signal by the A/D converter 107. The resulting signal is stored in the image storage component 108. The symbol reader 109 reads a symbol contained in image data (hereafter referred to as a processing target image) stored in the image storage component 108. More specifically, the symbol reader 109 extracts a reference pattern for the symbol 7a included in the combination object 7, and determines the position and the inclination of the symbol 7a based on the extracted information. The symbol reader 109 also extracts a pattern neighboring the reference pattern. Based on the arrangement of the neighboring pattern, the symbol reader 109 recognizes the position and the size of cells included in the symbol 7a. The symbol reader 109 determines whether each cell is a black cell or a white cell or determines the size of each cell through binarization or other processing.

The symbol reader 109 further encodes binary information for each cell based on the above processing results. The symbol reader 109 categorizes the resultant codes by their symbol characters, while checking the values (code words) indicated by the symbol characters for errors, and correcting any detected errors. The binary information is decoded and is output to the mask area setting component 110 and the output component 113. The detailed configuration and the operation of the symbol reader 109 will be described later.

The mask area setting component 110 sets a mask area containing the symbol 7a using the processing results obtained by the symbol reader 109. The mask area includes an area forming the symbol 7a (hereafter referred to as a symbol area) and a quiet zone. The quiet zone is an area neighboring the symbol area. The quiet zone includes no cell. The position and the size of the quiet zone are defined by the specifications of the symbol 7a (e.g., the specifications of one-dimensional barcodes, two-dimensional barcodes, QR Code, or DotCode). The mask area setting component 110 may fill the set mask area with a predetermined color and/or with pixels having a predetermined luminance. The detailed configuration and the operation of the mask area setting component 110 will be described later.

The object recognition component 111 recognizes an object located in an area other than the mask area in the processing target image. More specifically, the object recognition component 111 in the present embodiment recognizes the characters (the object 7b) arranged close to the symbol 7a. The detailed configuration and the operation of the object recognition component 111 will be described later.

The determination component 112 determines a match between the information represented by the read symbol 7a and the recognized character information by using the processing results obtained by the symbol reader 109 and the processing results obtained by the object recognition component 111. When failing to find a match between the information represented by the read symbol 7a and the character information, the determination component 112 determines that the product including the printed or inscribed combination object 7 is defective.

The output component 113 receives the processing results from the symbol reader 109, the object recognition component 111, and the determination component 112, and outputs the received results to the host system 11 and the monitor 4.

Figure 2:
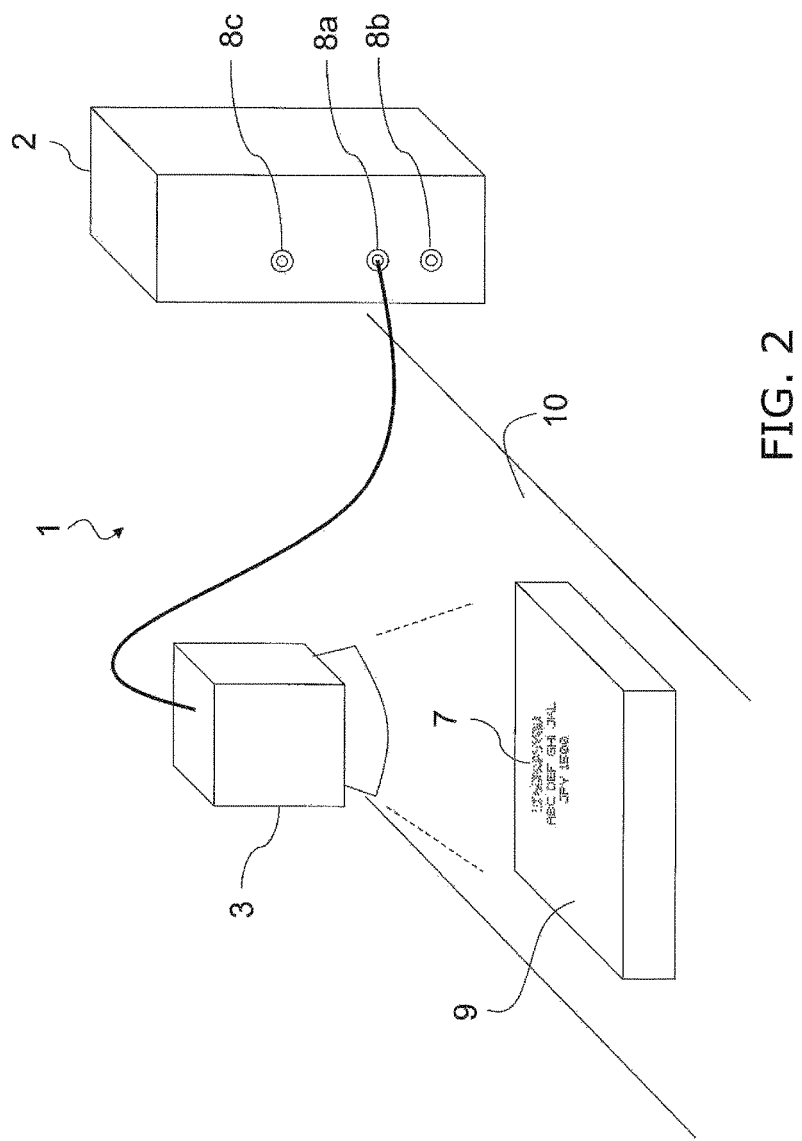
FIG. 2 shows the appearance and the example use of the image processing apparatus.
Figure 3:
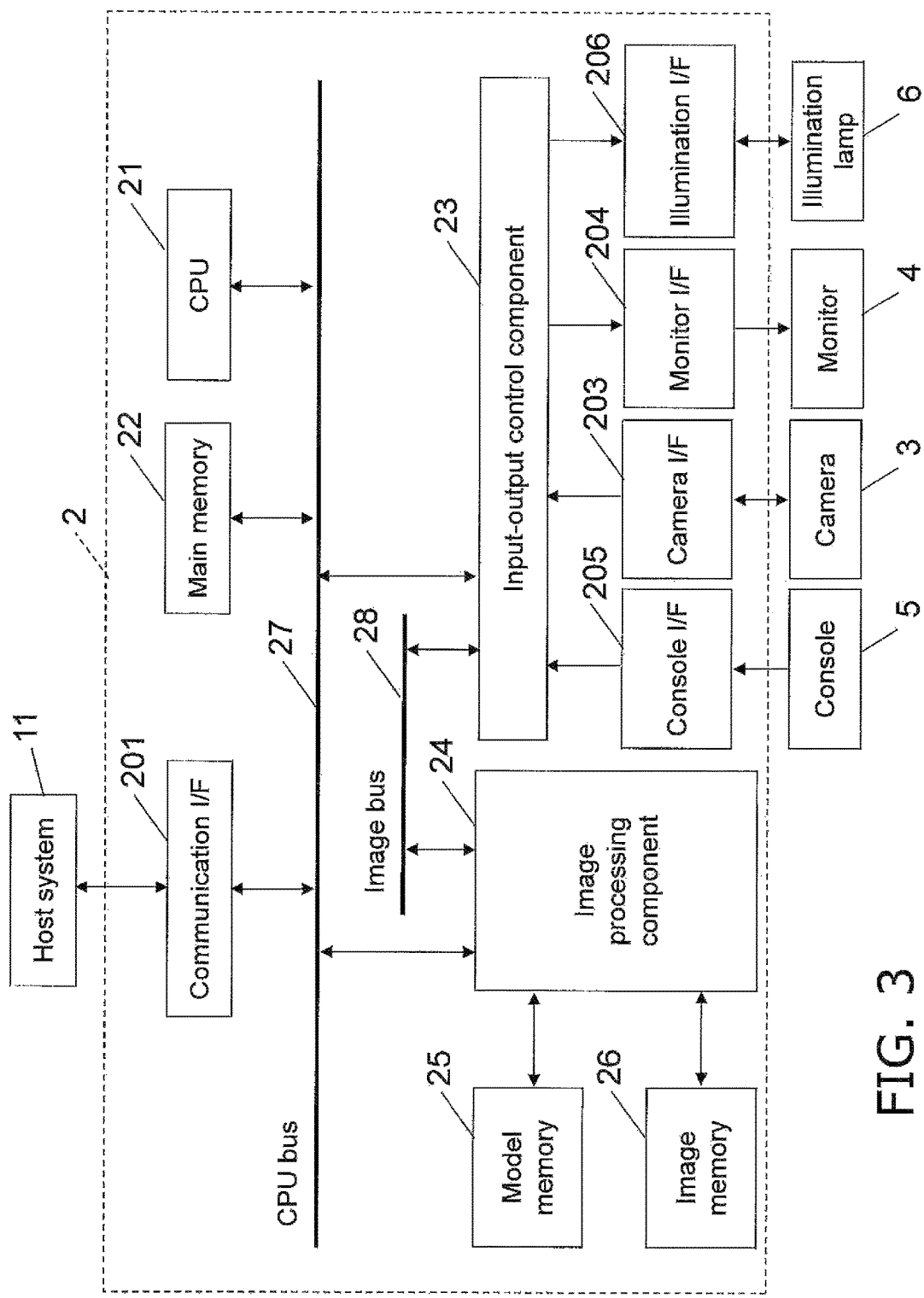
FIG. 3 shows the internal hardware configuration of the image processing apparatus.

FIGS. 2 and 3 show a specific example structure of the image processing apparatus 1. FIG. 2 shows the appearance and the example use of the image processing apparatus 1. The image processing apparatus 1 is incorporated in a manufacturing control system used in an assembly line for packages, such as cigarette packs. The image processing apparatus 1 basically includes a controller 2, which incorporates a computer, and the camera 3, or typically a charge-coupled device (CCD) camera, which is connected to the controller 2 with a cable. The camera 3 corresponds to an image input component for receiving an input image. The controller 2 has a connector 8a for connecting the camera and connectors 8b and 8c for connecting the monitor 4 and a console 5 (both shown in FIG. 3) on its front surface. The camera 3 accommodates the illumination lamp 6.

The image processing apparatus 1 is installed to read the combination object 7 printed on the surface of a package 9. The camera 3 is arranged above a conveyor 10 for transporting parts (hereafter simply a conveyor 10). The controller 2 is arranged near the conveyor 10 and is connected to the host system 11. In response to a command from the host system 11, the controller 2 activates the camera 3 to capture an image of the combination object 7. The controller 2 then decodes binary information and character information represented by the combination object 7 included in the captured image.

The controller 2 transmits the resultant decoded information to the host system 11. The combination object 7 contains various pieces of information about the product (hereafter referred to as manufacturing information) to achieve traceability of the product. The manufacturing information includes, for example, the type of the product, the product number, and the shipment destination. The host system 11 uses such information in control of, for example, switching the route of the conveyor 10 or transmitting commands to manufacturing devices (not shown).

FIG. 3 is a hardware block diagram of the image processing apparatus 1 or mainly the controller 2. The controller 2 mainly includes a central processing unit (CPU) 21, a main memory 22, an input-output control component 23, an image processing component 24, a model memory 25, and an image memory 26. The camera 3, the monitor 4, the console 5, and the illumination lamp 6 incorporated in the camera 3 are connected to the input-output control component 23 with the respective interface circuits 203, 204, 205, and 206. The camera interface circuit 203 includes the A/D converter 107 described above.

The CPU 21 transmits and receives data and commands to and from the host system 11 through a communication interface circuit 201. The communication interface circuit 201 and the CPU 21 capable of receiving trigger signals function as the trigger input component 106 in FIG. 1.

The input-output control component 23 and the image processing component 24 are each connected to the CPU 21 with a CPU bus 27. The input-output control component 23 and the image processing component 24 are connected to each other with an image bus 28 to transmit and receive image data between them. An image output from the camera 3 is provided from the input-output control component 23 to the image processing component 24 and is stored in the image memory 26. The image memory 26 corresponds to the image storage component 108 in FIG. 1. The image processing component 24 reads an image stored in the image memory 26 in accordance with a command from the CPU 21, and provides the image to the input-output control component 23.

The input-output control component 23 is capable of selectively displaying an image provided from the image processing component 24 and a real-time image input from the camera 3 on the monitor 4. The input-output control component 23 receives, from the CPU 21, data for displaying the results of reading of the symbol 7a, recognition of the object 7b, and determination for a match between the information represented by the symbol 7a and the character information. The input-output control component 23 displays these results on the monitor 4.

The main memory 22 storing programs needed for the operation of the CPU 21 is also used to temporarily store data generated from the processing or to accumulate the results of reading of the symbol 7a, recognition of the object 7b, and determination described above.

The model memory 25 stores model patterns for extracting a reference pattern, a neighboring pattern, and a quiet zone for the symbol 7a, and character patterns for recognizing characters. The model memory 25 is connected to the image processing component 24 together with the image memory 26. The image processing component 24 includes a processor and a digital arithmetic circuit dedicated to image processing. The image processing component 24 corresponds to the symbol reader 109, the mask area setting component 110, and the object recognition component 111 in FIG. 1.

The main memory 22 stores programs corresponding to the imaging controller 104, the illumination controller 105, the determination component 112, and the output component 113 shown in FIG. 1. The CPU 21 functions as these processing components by executing the processing based on the corresponding programs.

To allow the image processing apparatus 1 to read the combination object 7 on each package 9 transported on the conveyor 10 one after another, the controller 2 is programmed to rapidly repeat the process of activating the camera 3 to capture an image of the combination object 7, reading the symbol 7a in the image, and recognizing the object 7b. Each package 9 is positioned by the conveyor 10. This allows the camera 3 to capture an image of the combination object 7 by simply moving to a preset position. However, the position and the orientation of the combination object 7 of each package 9 to be imaged differs slightly. Additionally, the symbol 7a and the object 7b are arranged close to each other for convenience of users. Presetting the camera for only the area occupied by the symbol 7a or for only the area occupied by the object 7b in the image is difficult. To overcome this difficulty, the controller 2 extracts the area of the symbol 7a in the image through image processing, and masks the extracted area of the symbol 7a to improve the accuracy in recognizing the object 7b.

Figure 4:
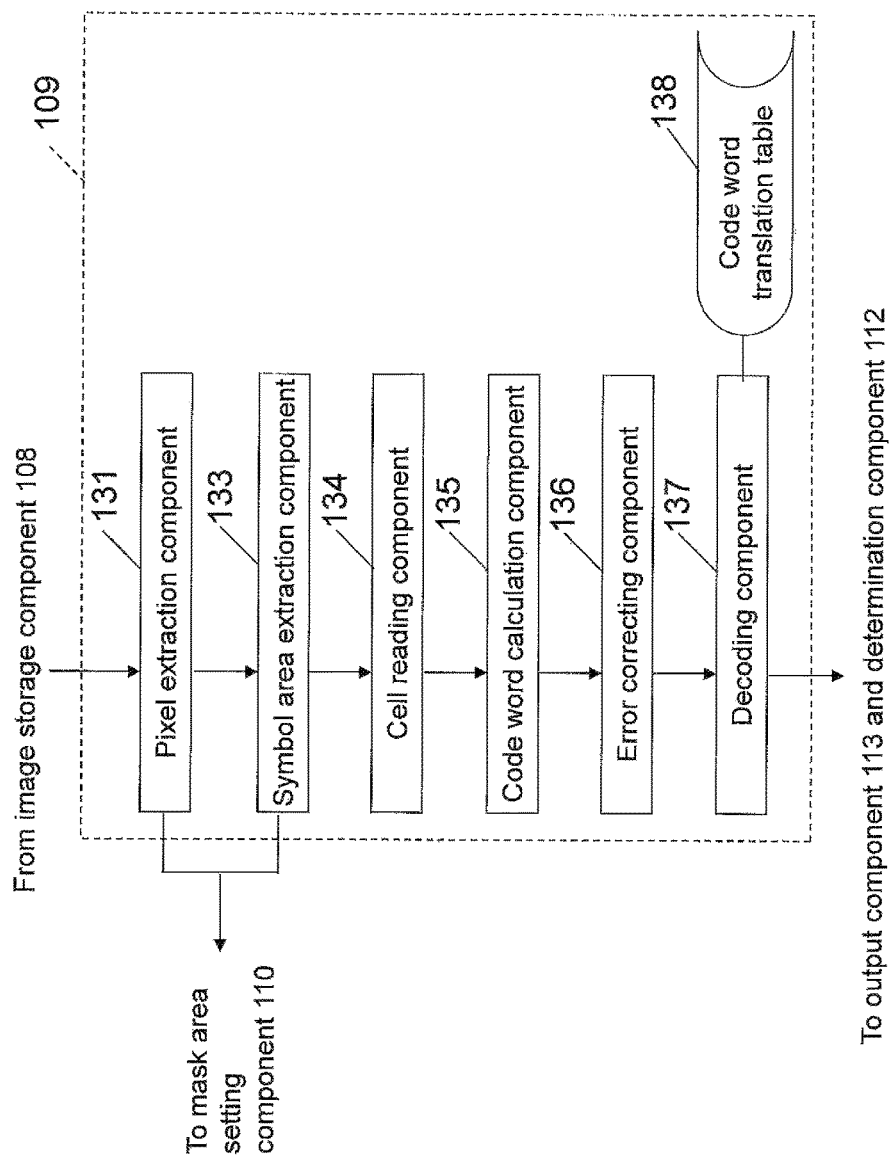
FIG. 4 is a block diagram showing a detailed configuration of a symbol reader.

The symbol reader 109 will now be described in detail. FIG. 4 is a block diagram showing a detailed configuration of the symbol reader 109. The symbol reader 109 includes a pixel extraction component 131, a symbol area extraction component 133, a cell reading component 134, a code word calculation component 135, an error correcting component 136, and a decoding component 137.

The pixel extraction component 131 extracts pixels representing a symbol color and/or pixels representing a non-symbol color. The symbol color is the color of bars, dots, or cells (hereafter referred to as symbol elements). The non-symbol color is placed to surround the symbol color to distinguish the symbol elements. The pixel extraction component 131 extracts reference symbol elements, and then extracts symbol elements neighboring the reference symbol elements. The pixel extraction component 131 then extracts pixels representing the symbol elements, or pixels neighboring the symbol elements.

The symbol area extraction component 133 extracts a rectangular area (hereafter, a symbol area) containing the reference symbol elements and their neighboring symbol elements extracted by the pixel extraction component 131. The symbol area forms the symbol 7a. For such symbols as QR Code and Data Matrix, the symbol area extraction component 133 may use finder patterns to extract symbol areas whose height and width are defined by finder patterns.

The cell reading component 134 rearranges pieces of information for the symbol elements extracted by the pixel extraction component 131 in accordance with the specifications for the corresponding symbol. The code word calculation component 135 calculates the code word based on information about the dots read by the cell reading component 134. The resultant code word includes error correction codes. The error correcting component 136 performs error correction of the code word. Finally, the decoding component 137 translates the code word into a character string by referring to a code word translation table 138. The code word translation table 138 stores code words and their corresponding characters. The code word translation table 138 is stored in the model memory 25.

Figure 5:
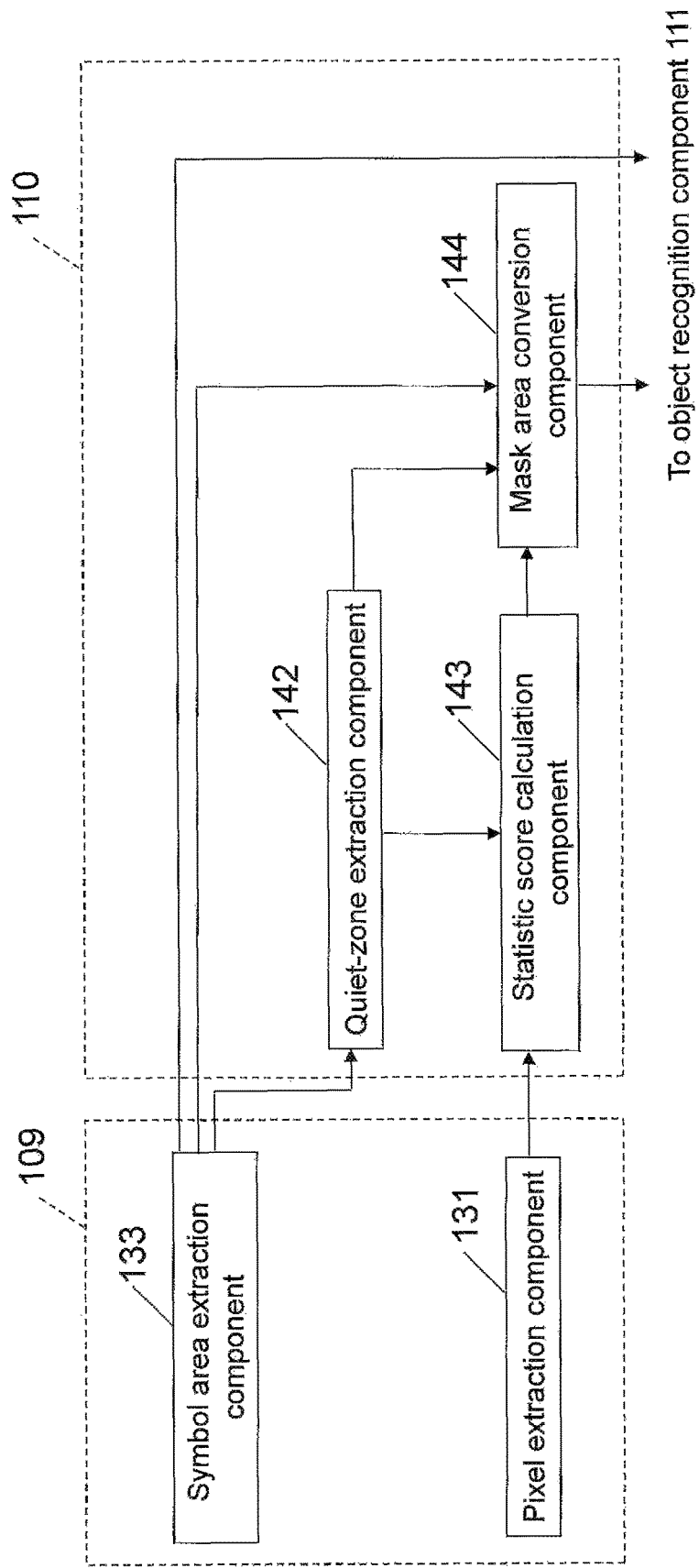
FIG. 5 shows an example of a detailed configuration of a mask area setting component.

The mask area setting component 110 will now be described in detail. FIG. 5 is a detailed block diagram of the mask area setting component 110. The mask area setting component 110 includes a quiet-zone extraction component 142, a statistic score calculation component 143, and a mask area conversion component 144.

The quiet-zone extraction component 142 extracts a quiet zone based on the border of the symbol area described above. As shown in FIG. 6A, the quiet zone is an area in contact with and neighboring the symbol area. The size of the quiet zone is preset in accordance with the specifications of each symbol. For example, DotCode defines a quiet zone with a width of three dots surrounding a symbol area.

The statistic score calculation component 143 calculates the statistic score of the pixel components defining the brightness and/or the color of pixels extracted by the pixel extraction component 131 or pixels included in the quiet zone extracted by the quiet-zone extraction component 142. The pixels extracted by the pixel extraction component 131 are pixels representing the symbol color and/or pixels representing the non-symbol color. The pixel components defining the brightness and/or the color may be parameters in a color space, such as luminance values, RGB values, or LUV values. The statistic score may be any value representing the symbol area, such as a mean, a median, a maximum, or a minimum. When an image processed by the mask area conversion component 144 is a grayscale image or a binary image, the statistic score calculation component 143 may calculate the statistic score of the luminance values. When an image processed by the mask area conversion component 144 is a color image, the statistic score calculation component 143 may calculate the statistic score of the mean, median, maximum, or minimum values of the parameters defining the color space (e.g., RGB).

The mask area conversion component 144 sets a mask area to contain the symbol area and to extend within the quiet zone. The mask area is set in this manner because the processing target object 7b is likely to be located outside the quiet zone. The mask area may not be rectangular. The mask area conversion component 144 converts the pixel components of all the pixels in the set mask area to the statistic score, or perform image processing to eliminate the symbol color. The mask area conversion component 144 performs any of the first processing to the fourth processing described below.

First Processing

The statistic score calculation component 143 calculates the statistic score of pixel components defining the brightness and/or the color of the symbol for the pixels representing the symbol color and/or the pixels representing the non-symbol color extracted by the pixel extraction component 131. The mask area conversion component 144 converts the pixel components of all the pixels in the mask area to the statistic score of the pixel components of the pixels extracted by the pixel extraction component 131. Depending on the statistic score to be used, the pixel components of all the pixels in the mask area may be converted to the statistic score of the pixel components of the symbol color pixels, or to the statistic score of the pixel components of the non-symbol color pixels, or to an intermediate color between the symbol color and the non-symbol color. When the image processed by the mask area conversion component 144 is a grayscale image or a binary image, the mask area conversion component 144 converts the luminance values of all the pixels in the mask area to the statistic score of the luminance values of the pixels extracted by the pixel extraction component 131. When the image processed by the mask area setting component 110 is a color image, the mask area conversion component 144 converts the parameters defining the color space of all the pixels in the mask area to the statistic score of the parameters of the pixels extracted by the pixel extraction component 131. FIG. 6B shows an intermediate processing image I2 resulting from the above processing performed in the mask area of a processing target image M. The intermediate processing image I2 reduces the likelihood that the object recognition component 111 (described later) recognizes the mask area as a part of the object 7b. This improves the accuracy in recognizing the object 7b.

Second Processing

Figures 7A, 7B:
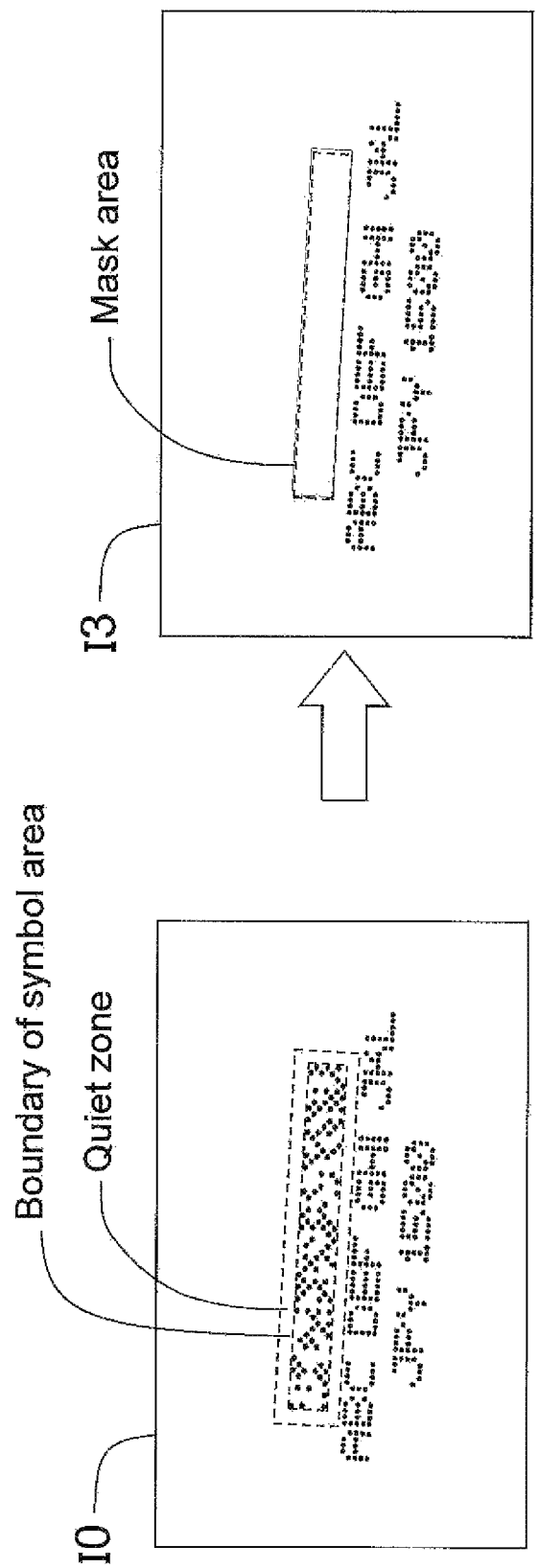
FIGS. 7A and 7B are diagrams describing another example of the processing performed by the mask area setting component.

The statistic score calculation component 143 calculates the statistic score of pixel components defining the brightness and/or the color of pixels representing the non-symbol color extracted by the pixel extraction component 131. The mask area conversion component 144 converts the pixel components of the symbol color pixels in the mask area to the statistic score of the pixel components of the non-symbol color pixels. FIG. 7A shows a processing target image M. FIG. 7B shows an intermediate processing image I3 resulting from such masking of the processing target image 10. The intermediate processing image I3 is an example image generated by eliminating the black dots from the mask area. The intermediate processing image I3 allows the black dot area to have substantially the same color as the background color, and reduces the likelihood that the object recognition component 111 (described later) recognizes the mask area as a part of the object 7b. This improves the accuracy in recognizing the object 7b.

Third Processing

The statistic score calculation component 143 calculates the statistic score of pixel components defining the brightness and/or the color of the pixels in the quiet zone determined by the quiet-zone extraction component 142. The mask area conversion component 144 converts the pixel components of all the pixels in the symbol area to the statistic score calculated by the statistic score calculation component 143. This process may also generate an intermediate processing image I3 resulting from eliminating the black dots from the mask area as shown in FIG. 7B.

Fourth Processing

The mask area conversion component 144 applies an erosion filter to each pixel of the symbol area set by the symbol area setting component 141. When, for example, the symbol elements are black, the mask area conversion component 144 extracts the maximum value of the pixel components of the pixels surrounding the processing target pixel and replaces the pixel component of the target pixel with the maximum value. When the symbol elements are white, the mask area conversion component 144 extracts the minimum value of the pixel components of the pixels surrounding the processing target pixel and replaces the pixel component of the target pixel with the minimum value. Such processing eliminates the symbol color pixels. This process also generates the intermediate processing image I3 resulting from eliminating the black dots from the mask area as shown in FIG. 7B. The intermediate processing image I3 allows the black dot area to have substantially the same color as the background color, and reduces the likelihood that the object recognition component 111 (described later) recognizes the mask area as a part of the object 7b. This improves the accuracy in recognizing the object 7b.

Processing without Mask Area Conversion

Figure 8A:
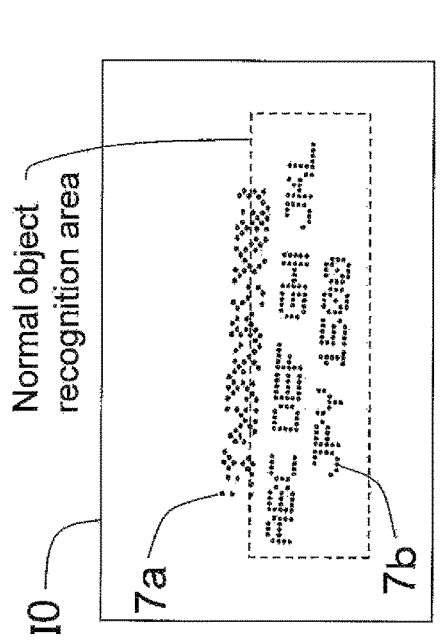
FIGS. 8A to 8C are diagrams describing an object recognition area changed through the setting performed by the mask area setting component shown in FIG. 5.
Figure 8C:
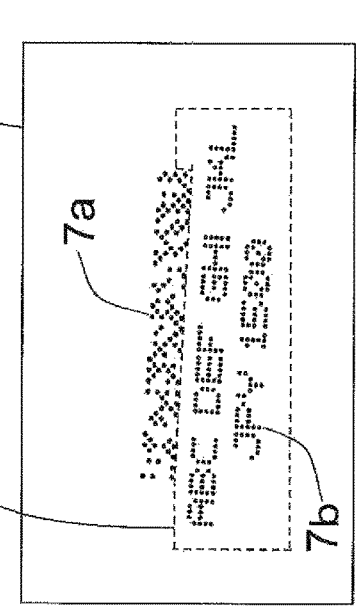
Figure 8B:
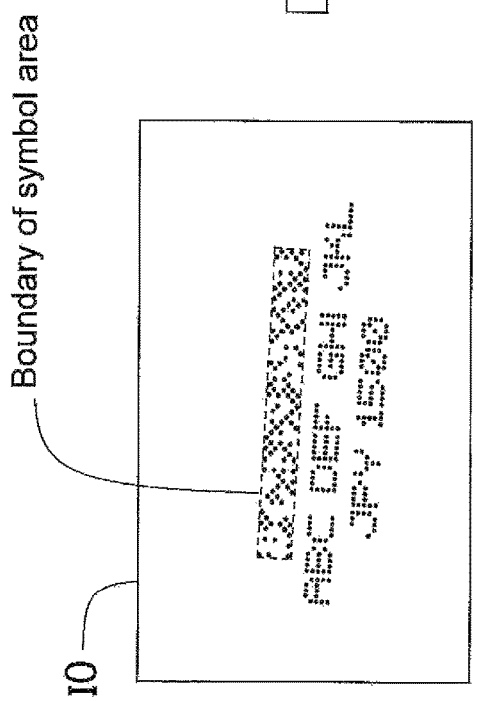

Although the first processing to the fourth processing described above involve mask area conversion, the mask area setting component 110 may not convert a mask area, but may simply set a mask area. In this case, the mask area setting component 110 sets a symbol area determined by the symbol area extraction component 133 as a mask area. When the symbol 7a is partially in a normal area for object recognition as shown in FIG. 8A, extracting the symbol area as shown in FIG. 8B changes the object area to exclude the symbol 7a as shown in FIG. 8C. More specifically, the object recognition component 111 recognizes the object 7b in the area excluding the symbol area of the processing target image. This prevents the symbol 7a from affecting the recognition of the object 7b during the processing performed by the object recognition component 111 (described later).

The object recognition component 111 will now be described in detail. The object recognition component 111 in this embodiment may use, for example, a method described in Japanese Unexamined Patent Application Publication No. 2013-182567. With this method, the object recognition component 111 first binarizes an image in an object recognition target area, and then sets inclined lines passing through a processing boundary pixel and calculates the cumulative density for each line. The object recognition component 111 presumes that a character string extends parallel to the line with the highest cumulative density. The object recognition component 111 extracts individual characters in the character string with a method known in the art, and then recognizes the characters through matching.

Figure 9:
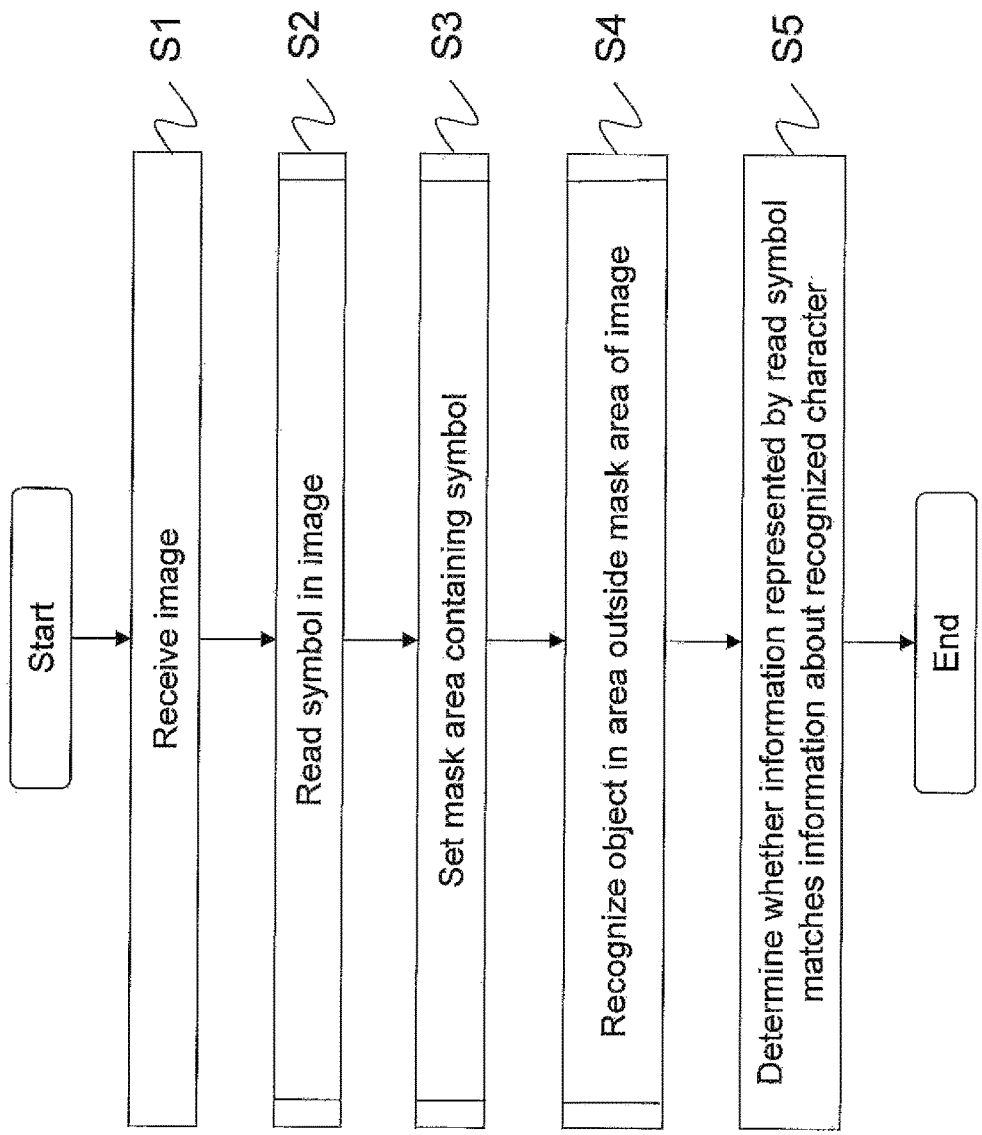
FIG. 9 is a flowchart of the overall processing performed by the image processing apparatus according to the first embodiment.

The processing performed by the image processing apparatus 1 will now be described. FIG. 9 is a flowchart of the overall processing performed by the image processing apparatus 1 of the first embodiment. In step S1, a processing target image is input through the camera 3. In step S2, a symbol 7a in the processing target image is read. This process includes extracting symbol color pixels and/or non-symbol color pixels by the pixel extraction component 131 and extracting a symbol area forming the symbol 7a by the symbol area extraction component 133.

In step S3, a mask area containing the symbol is set with the method described below. The statistic score calculation component 143 first calculates the statistic score of pixel components defining the brightness and/or the color of the symbol color pixels and/or the non-symbol color pixels extracted by the pixel extraction component 131. The mask area conversion component 144 then sets a mask area containing the symbol area determined by the symbol area extraction component 133. The mask area conversion component 144 converts the pixel components of all the pixels in the set mask area to the calculated statistic score.

Alternatively, the statistic score calculation component 143 calculates the statistic score of pixel components defining the brightness and/or the color of the non-symbol color pixels extracted by the pixel extraction component 131. The mask area conversion component 144 converts the pixel components of the symbol color pixels in the mask area to the statistic score of the pixel components of the non-symbol color pixels.

Alternatively, the statistic score calculation component 143 calculates the statistic score of pixel components defining the brightness and/or the color of the pixels in a quiet zone extracted by the quiet-zone extraction component 142. The mask area conversion component 144 converts the pixel components of all the pixels in the symbol area extracted by the symbol area extraction component 133 to the calculated statistic score.

Alternatively, the mask area conversion component 144 applies the erosion filter to the symbol area to eliminate the symbol color pixels. Alternatively, the mask area setting component 110 sets the symbol area as a mask area.

After step S3, the object recognition component 111 recognizes an object 7b in an area other than the mask area of the processing target image (step S4) with the method described above in detail. When the method without involving mask area conversion is selected in step S3, the object 7b is recognized in step S4 in the area excluding the symbol area of the processing target image.

In step S5, the determination component 112 finally determines whether the information represented by the read symbol 7a matches the character information recognized in step S4.

Second Embodiment

The first embodiment describes inspection for the character object 7b printed close to the symbol 7a. Certain embodiments may also be applicable to defect inspection or appearance inspection of, for example, a circuit board having an inscribed symbol 7a. Certain embodiments may be particularly effective for defect inspection or appearance inspection of an inspection target located close to the symbol 7a. The second embodiment describes an example of defect inspection and appearance inspection.

Figure 10:
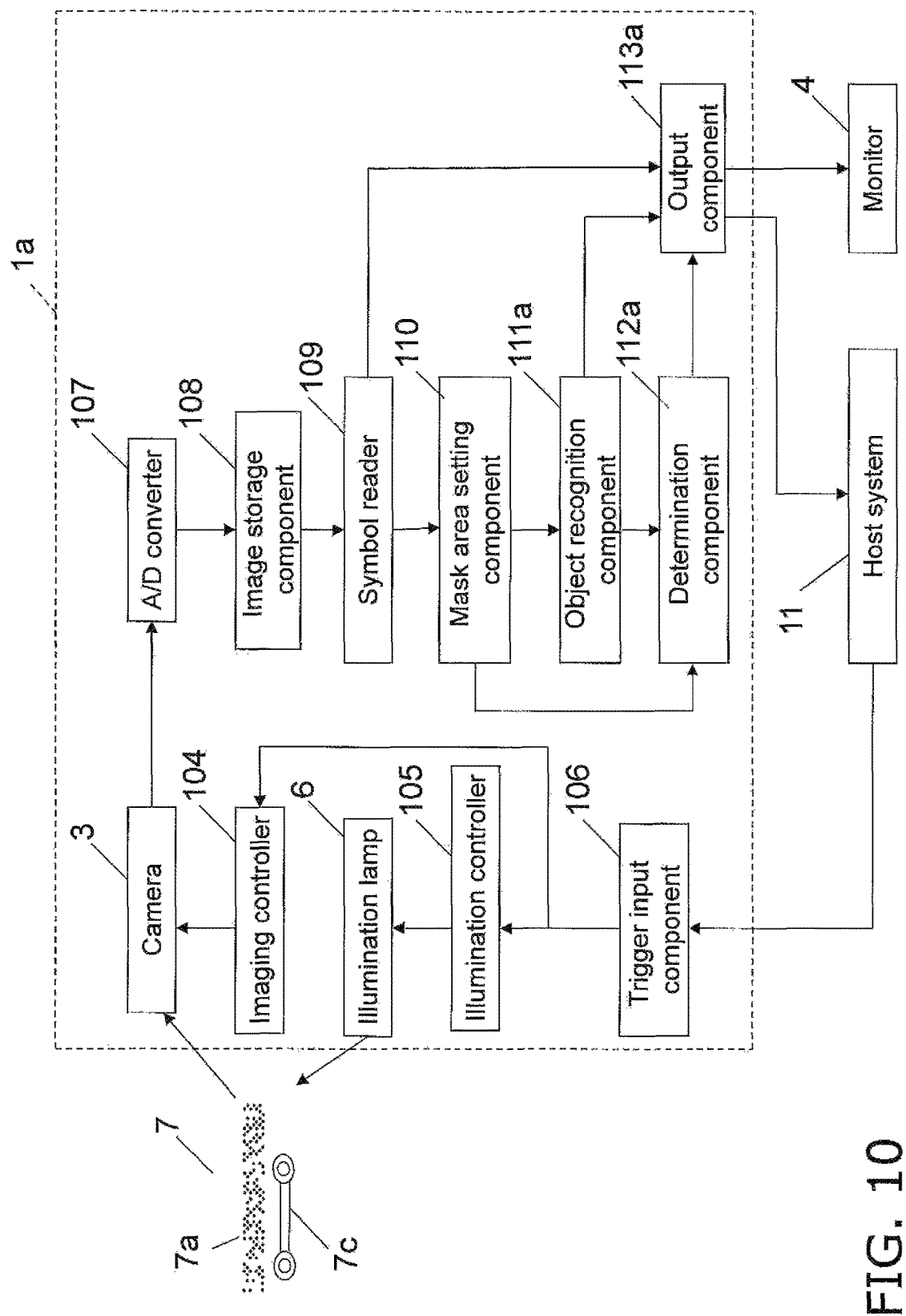
FIG. 10 is a block diagram showing the structure of an image processing apparatus according to a second embodiment.

FIG. 10 is a block diagram showing the structure of an image processing apparatus 1a according to the second embodiment. In FIG. 10, the components that are the same as in FIG. 1 are given the same reference numerals as those components, and will not be described. In the second embodiment, an object 7c included in a combination object 7 is not a character string but is a circuit part or a wiring pattern. The image processing apparatus 1a includes an object recognition component 111a, a determination component 112a, and an output component 113a, which differ from the object recognition component 111, the determination component 112, and the output component 113 described in the first embodiment. The determination component 112a may be eliminated. The hardware configuration of the image processing apparatus 1a of the second embodiment is the same as shown in FIG. 3.

The object recognition component 111a may use, for example, a method described in Japanese Unexamined Patent Application Publication No. 2008-139262. This method intends to detect defects in circuit wiring. The wires in the circuit typically extend in the height, width, and 45-degree diagonal directions of the circuit board. The edge directions would thus be distributed at specific angles even when affected by rotation of the circuit board. A histogram of density gradient directions of edge pixels is created for each defect inspection area as a model, and is prestored in a model memory 25. The object recognition component 111a extracts an inspection area from an image processed by a mask area setting component 110 or from a processing target image. The image processed by the mask area setting component 110 corresponds to, for example, an image including a mask area with pixels colored with, for example, a non-symbol color as shown in FIGS. 6B and 7B. The inspection area may be an area excluding the area of the symbol 7a as shown in FIG. 8C. The object recognition component 111a outputs a histogram of density gradient directions of the edge pixels. When the output histogram includes a density gradient direction with a value greater than that in the corresponding model histogram stored in the model memory 25 by a predetermined reference value, the object recognition component 111a determines that the object 7c is defective.

The object recognition component 111a may recognize an object without excluding the area of the symbol 7a from the inspection area and without coloring the area of the symbol 7a, although the results from such recognition can be treated with lower reliability. The determination component 112a uses the object recognized without excluding the area of the symbol 7a from the inspection area and also the mask area set by the mask area setting component 110 to determine the reliability of the recognition results obtained by the object recognition component 111a. The determination component 112a then outputs the determined reliability to the output component 113a as a priority level. The processing performed by the determination component 112a may be eliminated when the object recognition component 111a excludes the area of the symbol 7a from the inspection area or uses the colored area of the symbol 7a in recognizing an object.

The output component 113a stores manufacturing information for the product represented by the read symbol 7a, information indicating whether the product has a defect, and the priority level (when the reliability is determined) into a database held by a host system 11. Through the processing described above, the output component 113a can provide an inspection operator with results of defect inspection or appearance inspection reflecting the presence of the symbol 7a.

Figure 11:
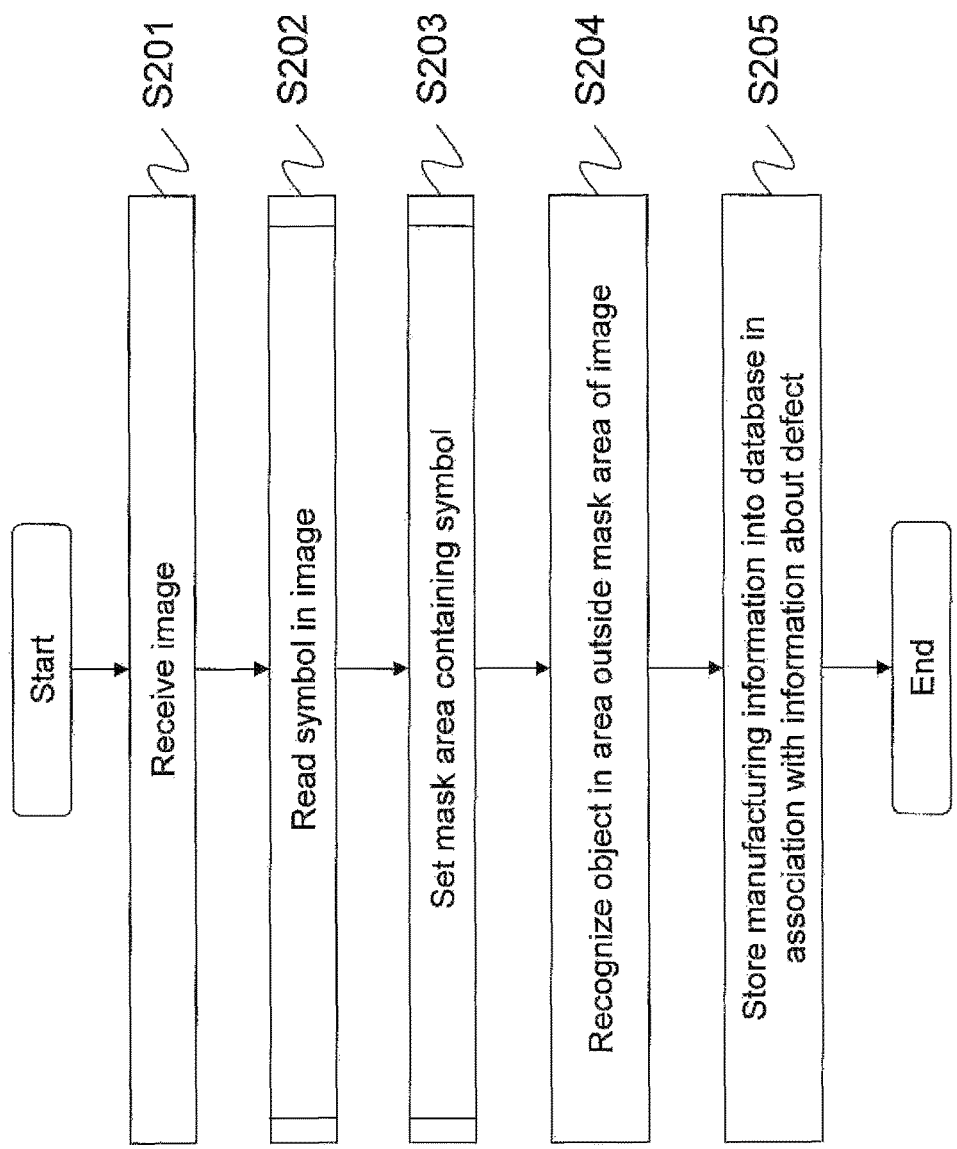
FIG. 11 is a flowchart of the overall processing performed by the image processing apparatus according to the second embodiment.

The processing performed by the image processing apparatus 1a will now be described. FIG. 11 is a flowchart of the overall processing performed by the image processing apparatus 1a of the second embodiment. The processing in steps S201 to S203 is the same as the processing in steps S1 to S3 performed by the image processing apparatus 1 of the first embodiment, and will not be described. In step S204, the object 7c to be recognized differs from the object 7b in the first embodiment, and thus the object 7c is recognized with a method different from the method used in the first embodiment. The object 7c is recognized with the method as described above. In step S205, the output component 113a stores at least the manufacturing information for the product and the information indicating whether the product has a defect into the database of the host system 11.

Described embodiments may be modified without departing from the spirit and scope of the invention.

In the above embodiments, the symbol 7a is a DotCode. Alternatively, the symbol 7a may be another code, such as a QR barcode or a Data Matrix code.

In the hardware configuration described in the above embodiments, the camera 3 is controlled by the controller 2. Alternatively, the camera 3 may incorporate all the capabilities of the controller 2. In another example, the capabilities of the controller 2 may be achieved by an image processing board and a computer.

One of the first processing, the second processing, and the third processing performed by the mask area setting component 110 may be combined with the fourth processing performed by the mask area setting component 110. The processing without involving mask area conversion performed by the mask area setting component 110 may also be combined with one or more of the first processing to the fourth processing.

Program data for all or some of the programs used in the above embodiments stored in a recording medium may be executed after being stored into a storage device, or may be executed directly. The recording medium may be, for example, a semiconductor memory such as a ROM, a RAM, or a flash memory, or a magnetic disk memory such as a flexible disk or a hard disk, an optical disc memory, such as a CD-ROM, a DVD, and a Blu-ray disc, or a memory card. The recording medium may be a communication medium such as a telephone line or a communication path.

All or some of the programs used in the above embodiments may typically be implemented by an integrated circuit called an LSI (large-scale integration) (an IC, a system LSI, a super LSI, or an ultra LSI depending on the degree of integration). Each of these programs may be formed separately using a single chip or some or all of the programs may be formed using a single chip. The circuit integration may not be achieved by LSI but may be achieved using a dedicated circuit or a general-purpose processor. The circuit integration may be achieved using a field programmable gate array (FPGA) that can be programmed after the LSI is manufactured, or a reconfigurable processor that can reconfigure connections or settings of circuit cells in the LSI.

The image processing method and the image processing apparatus, the program for implementing the method, and the recording medium storing the program improve the extraction accuracy of objects.

The invention claimed is:

1. An image processing method, comprising:
receiving an image, the image including a readable symbol and a readable object disposed around the readable symbol;
reading the readable symbol in the image;
extracting a quiet zone that is in contact with a readable symbol area in which the readable symbol is formed in the image, the quiet zone not including the readable object;
setting a mask area containing the readable symbol wherein the mask area extends within the quiet zone; and
recognizing the readable object located in an area other than the mask area of the image.

2. The image processing method according to claim 1, wherein
the readable symbol includes a symbol color and a non-symbol color,
the reading of the readable symbol in the image includes extracting pixels representing at least one of the symbol color and the non-symbol color, and
the setting of the mask area includes:
calculating a statistic score of pixel components defining at least one of a brightness and a color for the extracted pixels, and
converting pixel components defining the at least one of a brightness and a color for all pixels in the mask area to the statistic score.

3. The image processing method according to claim 1, wherein
the readable symbol includes a symbol color and a non-symbol color,
the reading of the readable symbol in the image includes extracting pixels representing the non-symbol color, and
the setting of the mask area includes:
calculating a statistic score of pixel components defining at least one of a brightness and a color for the extracted pixels, and
converting pixel components defining the at least one of a brightness and a color for pixels representing the symbol color in the mask area to the statistic score.

4. The image processing method according to claim 1, wherein
the readable symbol includes a symbol color and a non-symbol color,
the reading of the readable symbol in the image includes extracting the readable symbol area forming the readable symbol, and
the setting of the mask area includes:
calculating a statistic score of pixel components defining at least one of a brightness and a color for pixels in the quiet zone; and
converting pixel components defining the at least one of a brightness and a color for all pixels in the readable symbol area to the statistic score.

5. The image processing method according to claim 1, wherein
the readable symbol includes a symbol color and a non-symbol color,
the reading of the readable symbol in the image includes extracting the readable symbol area forming the readable symbol, and
the setting of the mask area includes processing the readable symbol area using an erosion filter to eliminate pixels representing the symbol color.

6. The image processing method according to claim 1, wherein
the reading of the readable symbol in the image includes extracting a readable symbol area forming the symbol,
the setting of the mask area includes setting the readable symbol area as the mask area, and
the recognizing of the object includes recognizing the object located in an area excluding the readable symbol area of the image.

7. The image processing method according to claim 1, wherein the readable object includes a character.

8. The image processing method according to claim 7, further comprising:
determining whether information represented by the read symbol matches character information representing the character.

9. The image processing method according to claim 1, wherein
the readable object is a defect in a product.

10. The image processing method according to claim 9, wherein
the readable symbol is information representing manufacturing information for the product, and the method further comprises storing, into a database, the manufacturing information in a manner associated with information indicating whether the product has the defect.

11. An image processing apparatus, comprising:
an image input component configured to receive an image including a readable symbol and a readable object disposed around the readable symbol;
a symbol reader configured to read the readable symbol in the image;
a quiet-zone extraction component configured to extract a quiet zone that is in contact with a readable symbol area in which the readable symbol is formed in the image, the quiet zone not including the readable object;
a mask area setting component configured to set a mask area containing the readable symbol wherein the mask area extends within the quiet zone; and
an object recognition component configured to recognize the readable object located in an area other than the mask area of the image.

12. The image processing apparatus according to claim 11, wherein
the readable symbol includes a symbol color and a non-symbol color,
the symbol reader includes a pixel extraction component configured to extract pixels representing at least one of the symbol color and the non-symbol color, and
the mask area setting component includes
a statistic score calculation component configured to calculate a statistic score of pixel components defining at least one of a brightness and a color for the extracted pixels; and
a mask area conversion component configured to convert pixel components defining the at least one of a brightness and a color for all pixels in the mask area to the statistic score.

13. The image processing apparatus according to claim 11, wherein
the readable symbol includes a symbol color and a non-symbol color,
the symbol reader includes a pixel extraction component configured to extract pixels representing the non-symbol color, and
the mask area setting component includes:
a statistic score calculation component configured to calculate a statistic score of pixel components defining at least one of a brightness and a color for the extracted pixels, and
a mask area conversion component configured to convert pixel components defining the at least one of a brightness and a color for pixels representing the symbol color in the mask area to the statistic score.

14. The image processing apparatus according to claim 11, wherein
the readable symbol includes a symbol color and a non-symbol color,
the symbol reader includes a symbol area extraction component configured to extract the readable symbol area forming the readable symbol, and
the mask area setting component includes:
a statistic score calculation component configured to calculate a statistic score of pixel components defining at least one of a brightness and a color for pixels in the quiet zone; and
a mask area conversion component configured to convert pixel components defining the at least one of a brightness and a color for all pixels in the readable symbol area to the statistic score.

15. The image processing apparatus according to claim 11, wherein
the readable symbol includes a symbol color and a non-symbol color,
the symbol reader includes a symbol area extraction component configured to extract the readable symbol area forming the readable symbol, and
the mask area setting component includes a mask area conversion component configured to process the readable symbol area using an erosion filter to eliminate pixels representing the symbol color.

16. The image processing apparatus according to claim 11, wherein
the symbol reader includes a symbol area extraction component configured to extract the readable symbol area forming the readable symbol,
the mask area setting component sets the readable symbol area as the mask area, and
the object recognition component recognizes the object located in an area excluding the readable symbol area of the image.

17. The image processing apparatus according to claim 11, wherein the readable object includes a character.

18. The image processing apparatus according to claim 17, further comprising:
a determination component configured to determine whether information represented by the readable symbol matches character information representing the character.

19. The image processing apparatus according to claim 11, wherein the readable object is a defect in a product.

20. The image processing apparatus according to claim 19, wherein
the readable symbol is information representing manufacturing information for the product, and
the apparatus further comprises an output component configured to store, into a database, the manufacturing information in a manner associated with information indicating whether the product has the defect.

21. A non-transitory computer-readable recording medium storing a program enabling a computer connected to an image input apparatus to implement a predetermined procedure, the predetermined procedure comprising:
receiving an image from the image input apparatus, the image including a readable symbol and a readable object disposed around the readable symbol;
reading readable the symbol in the image;
extracting a quiet zone that is in contact with a readable symbol area in which the readable symbol is formed in the image, the quiet zone not including the readable object;
setting a mask area containing the readable symbol wherein the mask area extends within the quiet zone; and
recognizing that the readable object is located in an area other than the mask area of the image.

* * * * *